(12) United States Patent
Kim et al.

(10) Patent No.: US 10,941,344 B2
(45) Date of Patent: Mar. 9, 2021

(54) LIQUID CRYSTAL CELL

(71) Applicant: LG Chem, Ltd., Seoul (KR)

(72) Inventors: Jung Woon Kim, Daejeon (KR); Eun Jung Lim, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 170 days.

(21) Appl. No.: 15/571,351

(22) PCT Filed: Aug. 25, 2016

(86) PCT No.: PCT/KR2016/009422
§ 371 (c)(1),
(2) Date: Nov. 2, 2017

(87) PCT Pub. No.: WO2017/034338
PCT Pub. Date: Mar. 2, 2017

(65) Prior Publication Data
US 2019/0112529 A1    Apr. 18, 2019

(30) Foreign Application Priority Data

Aug. 25, 2015  (KR) .................. 10-2015-0119523
Jan. 28, 2016   (KR) .................. 10-2016-0010835

(51) Int. Cl.
*C09K 19/54*      (2006.01)
*G02F 1/1337*    (2006.01)
(Continued)

(52) U.S. Cl.
CPC .............. *C09K 19/54* (2013.01); *C09K 19/02* (2013.01); *C09K 19/30* (2013.01); *C09K 19/542* (2013.01);
(Continued)

(58) Field of Classification Search
CPC ..... C09K 19/54; C09K 19/58; G02F 1/13743; G02F 1/1375
See application file for complete search history.

(56) References Cited

U.S. PATENT DOCUMENTS 3,910,682 A * 10/1975 Arai ................. C09K 19/22
                                                                 349/130
3,963,638 A *  6/1976 Bucher ............. C09K 19/582
                                                                 252/299.2
(Continued)

FOREIGN PATENT DOCUMENTS

JP    62010593 B  *  3/1987
JP    06059231 A  *  4/1994
(Continued)

OTHER PUBLICATIONS

Kossyrev et al., "One- and Two-Dimensionally Structured Polymer Networks in Liquid Crystals for Switchable Diffractive Optical Applications", Dec. 2004, Advanced Functional Materials, vol. 14 No. 12, 1227-1232. (Year: 2004).*
(Continued)

*Primary Examiner* — Chanceity N Robinson
*Assistant Examiner* — Anna Malloy
(74) *Attorney, Agent, or Firm* — Lerner, David, Littenberg, Krumholz & Mentlik, LLP

(57) ABSTRACT

A liquid crystal cell which is capable of switching between a transparent mode and a scattering mode by using a non-ionic compound as a liquid crystal additive for realizing the EHDI characteristics and has excellent performance such as a driving voltage characteristic, a haze characteristic and reliability by securing solubility of the additive for liquid crystals. Such a liquid crystal cell can be applied to various light modulation devices such as a smart window, a window protective film, a flexible display device, a light shielding plate for transparent display, an active retarder for 3D image display, or a viewing angle adjusting film.

8 Claims, 4 Drawing Sheets

(A)

(B)

(51) Int. Cl.
  *G02F 1/137* (2006.01)
  *C09K 19/02* (2006.01)
  *G02F 1/1343* (2006.01)
  *C09K 19/30* (2006.01)
  *G02F 1/1333* (2006.01)
  *G02B 5/00* (2006.01)

(52) U.S. Cl.
  CPC .............. *G02B 5/00* (2013.01); *G02F 1/137* (2013.01); *G02F 1/1333* (2013.01); *G02F 1/1337* (2013.01); *G02F 1/1343* (2013.01); *G02F 1/1375* (2013.01); *G02F 1/13743* (2013.01); *G02F 2001/13712* (2013.01); *G02F 2001/13756* (2013.01); *G02F 2001/133742* (2013.01)

(56) References Cited

U.S. PATENT DOCUMENTS

| | | | | |
|---|---|---|---|---|
| 3,972,589 | A * | 8/1976 | Skelly | C09K 19/56 349/163 |
| 4,105,298 | A * | 8/1978 | Levine | G02F 1/133711 349/130 |
| 4,180,475 | A * | 12/1979 | Schadt | C07C 45/515 252/299.4 |
| 5,270,843 | A * | 12/1993 | Wang | C09K 19/544 349/90 |
| 5,691,795 | A * | 11/1997 | Doane | C09K 19/02 349/115 |
| 2004/0164274 | A1 * | 8/2004 | Solomonson | C09K 19/52 252/299.7 |
| 2006/0091358 | A1 | 5/2006 | Netland et al. | |
| 2013/0342772 | A1 * | 12/2013 | Lim | G02F 1/1334 349/33 |
| 2014/0285751 | A1 | 9/2014 | Min et al. | |
| 2015/0331264 | A1 * | 11/2015 | Min | C09D 135/02 349/88 |
| 2016/0115389 | A1 | 4/2016 | Lim et al. | |
| 2016/0139455 | A1 * | 5/2016 | Yu | G02F 1/133512 349/42 |

FOREIGN PATENT DOCUMENTS

| | | | |
|---|---|---|---|
| JP | 20083217 A | 1/2008 | |
| JP | 2011132542 A | 7/2011 | |
| JP | 2015501950 A | 1/2015 | |
| KR | 20130063485 A | 6/2013 | |
| KR | 20130142734 A | 12/2013 | |
| KR | 101379017 B1 | 3/2014 | |
| KR | 20140077861 A * | 6/2014 | ........ C08F 222/1006 |
| KR | 20140077861 A | 6/2014 | |
| KR | 20140132620 A | 11/2014 | |
| KR | 20150007998 A | 1/2015 | |
| WO | 2013085315 A1 | 6/2013 | |

OTHER PUBLICATIONS

English translation of JP62010593. (Year: 1987).*
Wang et al., "Bistable polymer-dispersed cholesteric liquid crystal thin film enabled by a stepwise polymerization", Jun. 24, 2015, The Royal Society of Chemistry, 5, 58959-58965. (Year: 2015).*
English translation of JP06059231. (Year: 1994).*
Extended European Search Report including Written Opinion for Application No. EP16839626 dated Feb. 5, 2019.
Voet A et al: "Dielectric characteristics of pigment dispersions", Journal of Colloid Science, Feb. 1, 1952, pp. 1-10, XP024209543.
Search report from International Application No. PCT/KR2016/009422, dated Nov. 23, 2016.

* cited by examiner

[Figure 1]
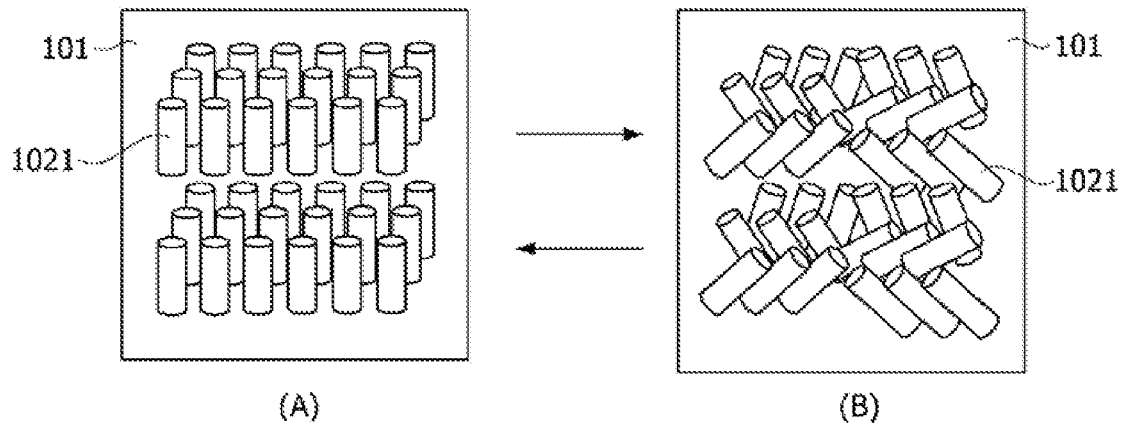
[Figure 2]
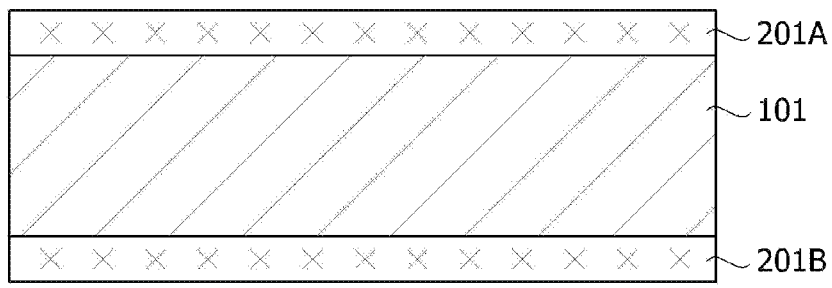
[Figure 3]
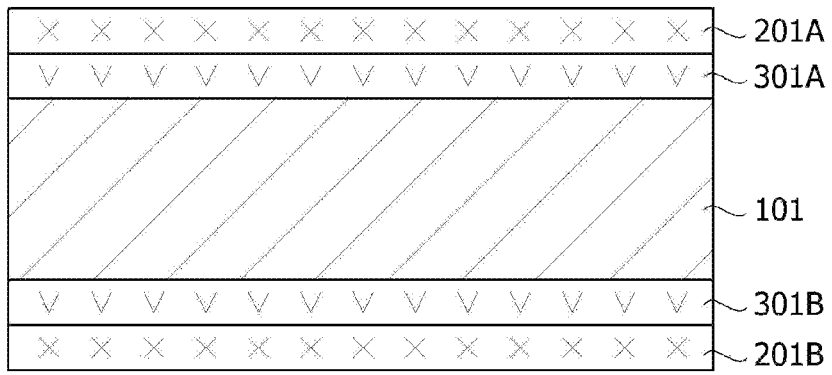

[Figure 4]
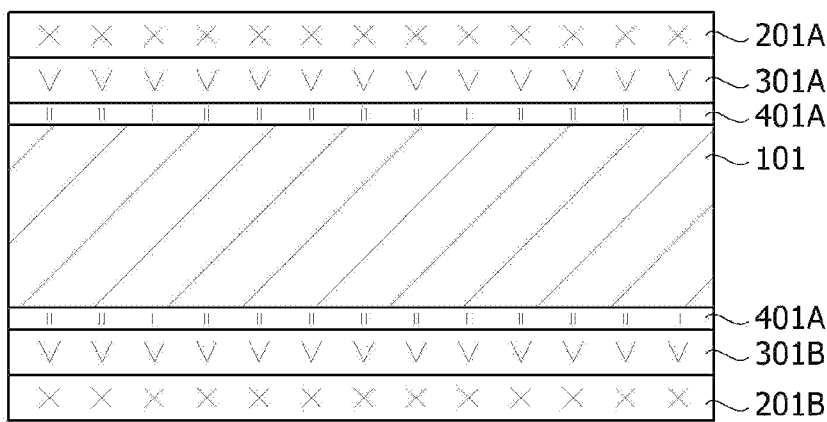
[Figure 5]
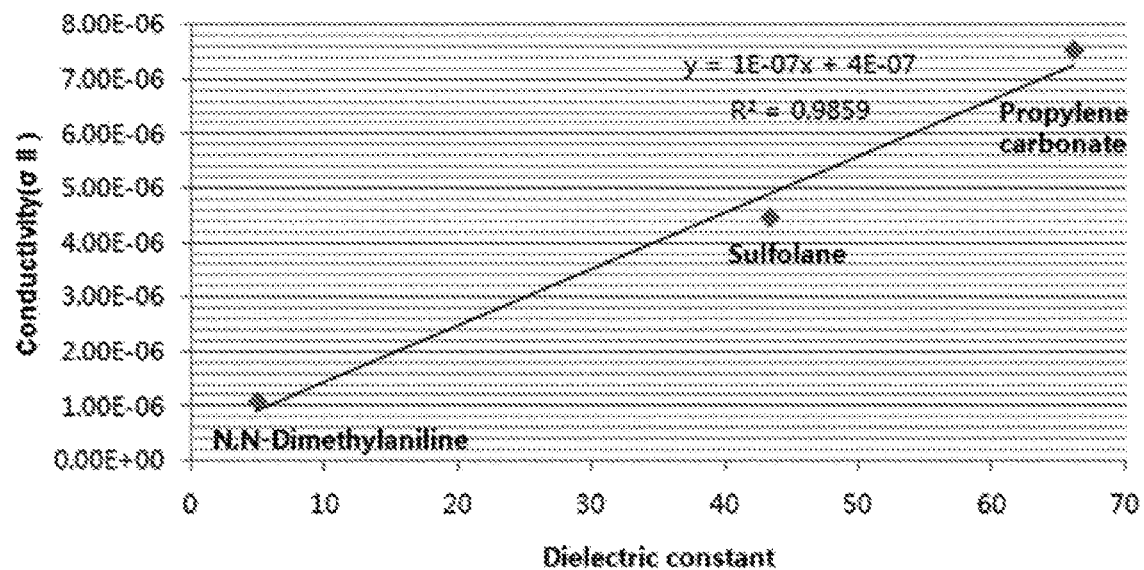

[Figure 6]
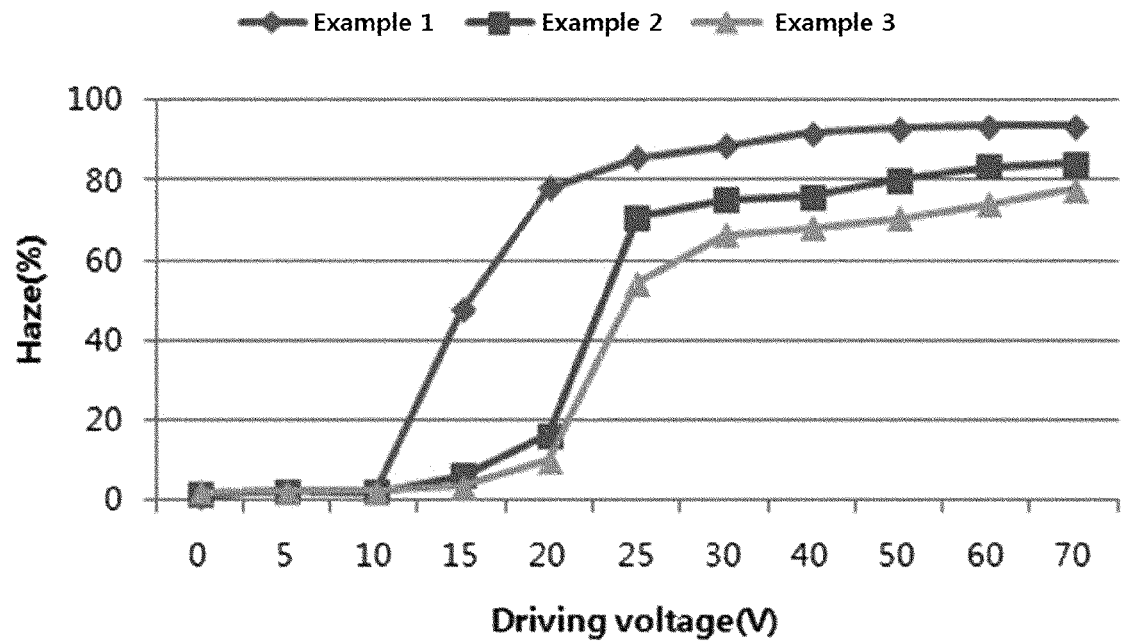
[Figure 7]
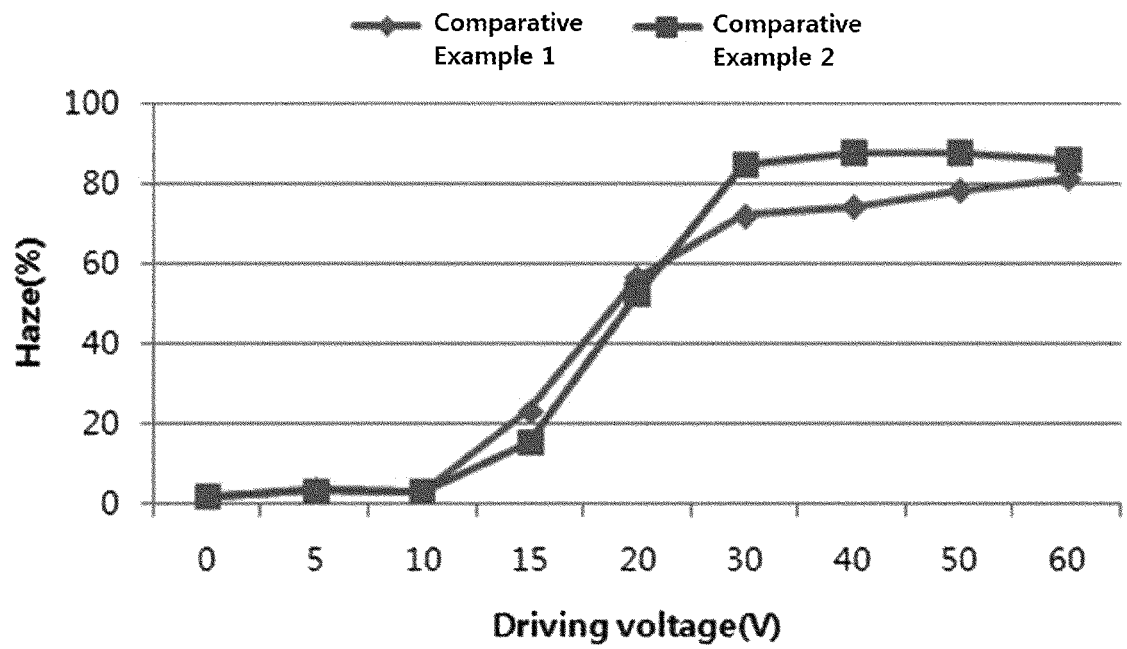

[Figure 8]
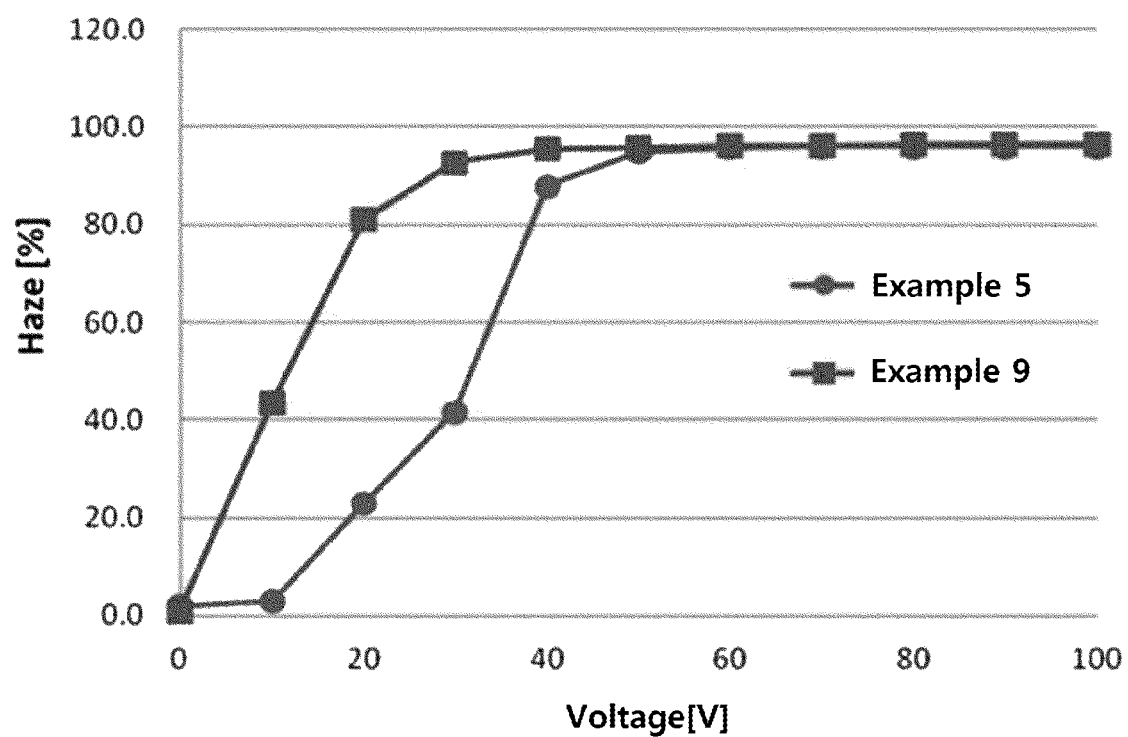

LIQUID CRYSTAL CELL

CROSS-REFERENCE TO RELATED APPLICATIONS

The present application is a national phase entry under 35 U.S.C. § 371 of International Application No. PCT/KR2016/009422 filed on Aug. 25, 2016, which claims priority from Korean Patent Application No. 10-2015-0119523 filed on Aug. 25, 2015 and Korean Patent Application No. 10-2016-0010835 filed on Jan. 28, 2016, the disclosures of which are herein incorporated by reference in their entireties.

TECHNICAL FIELD

Technical Field

The present application relates to a liquid crystal cell and its use.

BACKGROUND ART

A normally transparent mode device may mean, for example, a device which realizes a transparent mode in the absence of an external action, and is converted into a scattering mode under the external action, with again converted into the transparent mode if the external action is removed.

In Patent Document 1 (Korean unexamined patent publication No. 2014-0077861), a normally transparent mode device capable of changing between a transparent mode and a scattering mode is disclosed. The device of Patent Document 1 is a so-called PDLC (Polymer Dispersed Liquid Crystal) device realized by dispersing liquid crystals in a polymer matrix, wherein usually the liquid crystal compound is present in a state of being not aligned in the PDLC, thereby being a scattering state in the absence of the applied voltage, but it realizes a normally transparent mode by applying a vertical alignment film. However, the normally transparent mode device using the PDLC of Patent Document 1 has problems such as high driving voltage, change of residual haze levels due to exposure characteristics and degradation of haze characteristics.

A dynamic scattering mode is a type of liquid crystal mode, which means a liquid crystal mode that causes electrohydrodynamic instability (EHDI). As in Patent Document 2 (US unexamined patent publication No. 2006-0091358), the dynamic scattering mode liquid crystal cell generally includes liquid crystals of a nematic or smectic phase and an additive inducing EHDI, and strongly scatters light by optical anisotropy and fluid motion of the liquid crystals, while causing convection by the EHDI when an electric field is applied to the liquid crystal cell and continually forming a new convection structure with increasing the electric field to be changed into a final turbulent flow.

DISCLOSURE

Technical Problem

The present application provides, as a problem intended to be solved, a liquid crystal cell having excellent performance such as a driving voltage characteristic, a haze characteristic and reliability by being capable of switching between a transparent mode and a scattering mode and ensuring solubility of an additive for liquid crystals, and a use of the liquid crystal cell.

Technical Solution

The application relates to a liquid crystal cell. An exemplary liquid crystal cell can switch between a transparent mode and a scattering mode. In one example, the liquid crystal cell can switch between a transparent mode and a scattering mode by applying external energy. In this specification, applying external energy may mean, for example, applying voltage.

The liquid crystal cell may have a liquid crystal layer containing a liquid crystal compound and a non-ionic compound. The non-ionic compound may function as an additive that the EHDI (electrohydrodynamic instability) characteristics may be realized in the liquid crystal layer by adjusting conductivity of the liquid crystal layer. In one example, a horizontal conductivity at room temperature of the liquid crystal layer may be, for example, $1.0 \times 10^{-7}$ S/m. The conductivity of the liquid crystal layer will be specifically described below.

In the case of an ionic compound (salt) or a charge transfer complex which has been conventionally used as an additive for realizing the EHDI characteristics by controlling the conductivity of the liquid crystal layer, there are advantages that the driving voltage characteristics and haze characteristics are excellent compared to the normally transparent mode using the PDLC, but there are problems that in-plane unevenness can occur due to difference between solubility and dispersion property of the additive for liquid crystals, recrystallization occurs at room temperature due to poor mixing properties with the liquid crystals, and transmittance variable characteristics are lowered, if an anisotropic dye, as described below, is added, as well as storage reliability at a low temperature is not secured.

In order to solve the above problems, there is a method of using a small amount of additive, but there is a problem that the haze characteristic is lowered on driving, and thus the driving property is not good as a device for switching between the transparent mode and the scattering mode. Furthermore, in order to solve the above problems, there is a method of filtering off the recrystallized crystals, but there is a problem that after filtering the conductivity of the liquid crystal layer is changed to deteriorate characteristics.

The present application can reduce in-plane unevenness due to difference between solubility for the liquid crystal compound and dispersion property with the liquid crystal compound by using a non-ionic compound as an additive for realizing the EHDI characteristics, and improve the mixing property with the liquid crystal compound to provide a liquid crystal cell having excellent driving voltage and haze characteristic as well as excellent storage reliability. In addition, the liquid crystal cell of the present application may be not recrystallized at room temperature.

As long as the liquid crystal compound exists in a state such that the alignment can be switched in the liquid crystal cell and the optical characteristics of the liquid crystal cell can be controlled by switching the alignment, various types of liquid crystal compounds can be used without particular limitation. Specific examples of the liquid crystal compound include a nematic phase liquid crystal compound or a smectic phase liquid crystal compound, and the like.

As used herein, the term "smectic phase" may mean a liquid crystal phase having a characteristic in which the director of the liquid crystal compound aligns in a predetermined direction and at the same time the liquid crystal compound is arranged while forming a layer or a plane. As used herein, the term "nematic phase" means a liquid crystal phase in which the director of the liquid crystal compound is aligned in a predetermined direction, without forming a layered structure or a planar structure. As the liquid crystal compound, a non-polymerizable or non-crosslinkable liquid crystal compound without a polymerizable group or a crosslinkable group can be used in terms that the orientation of the liquid crystal compound can be changed by applying external energy such as voltage.

In one example, a nematic phase liquid crystal compound can be used as the liquid crystal compound. As the nematic phase liquid crystal compound, commercially available nematic liquid crystals may be used. Specifically, the nematic phase liquid crystal compound may be a compound represented by Formula 1 below.

[Formula 1]

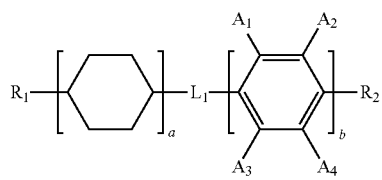

In Formula 1, $L_1$ is a single bond or —COO—, $R_1$ is hydrogen or a substituted or unsubstituted alkyl group having 1 to 10 carbon atoms or a substituted or unsubstituted alkenyl group having 1 to 10 carbon atoms, $R_2$ is hydrogen, halogen, a cyano group, a substituted or unsubstituted alkyl group having 1 to 10 carbon atoms, a substituted or unsubstituted alkenyl group, a cyclohexyl group unsubstituted or substituted with an alkyl group having 1 to 10 carbon atoms, or an alkoxy group having 1 to 10 carbon atoms unsubstituted or substituted with halogen, $A_1$ to $A_4$ represent independently of each other hydrogen, halogen or a cyano group, a is an integer of 0 to 3, b is an integer of 1 to 3, and the sum of a and b is 2 or more.

In the present specification, "unsubstituted" may mean a state that all the hydrogens of the functional groups above are not substituted.

Substitution herein may refer to a state in which one or more hydrogens of the functional groups have been replaced by any substituent. Unless otherwise specified in this specification, the substituent may be halogen, an alkyl group, an alkoxy group, an alkenyl group, an epoxy group, a cyano group, a nitro group or a carboxyl group.

The nematic phase liquid crystal compound represented by Formula 1 above may be, for example, a compound represented by Formulas 1-1 to 1-38 below, but is not limited thereto.

[Formula 1-1]

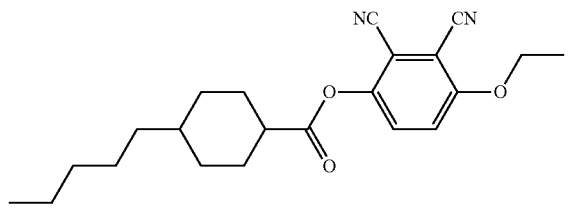

[Formula 1-2]

[Formula 1-3]

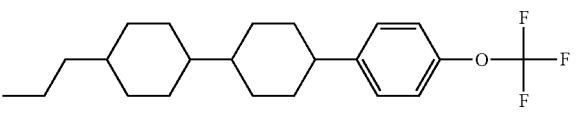

[Formula 1-4]

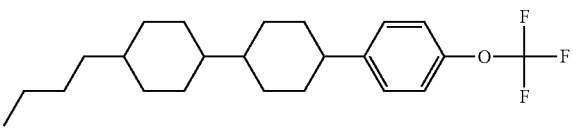

[Formula 1-5]

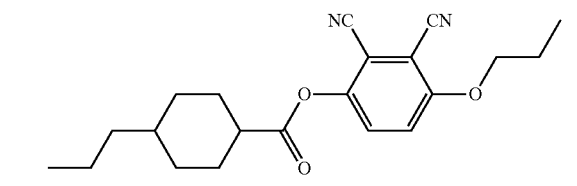

[Formula 1-6]

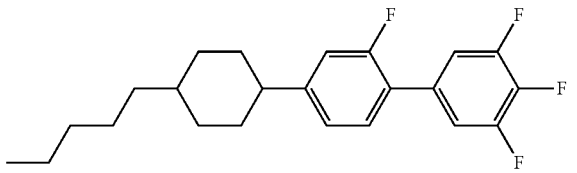

[Formula 1-7]

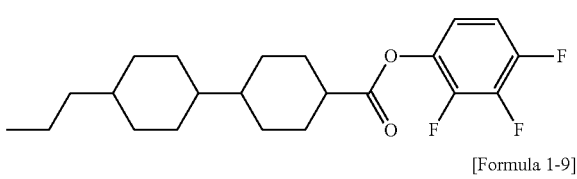

[Formula 1-8]

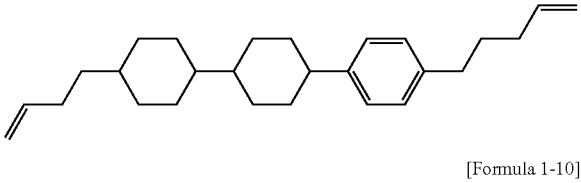

[Formula 1-9]

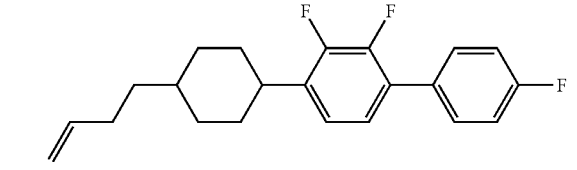

[Formula 1-10]

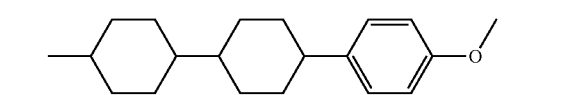

[Formula 1-11]

[Formula 1-12]
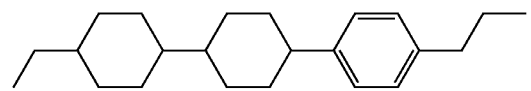
[Formula 1-13]
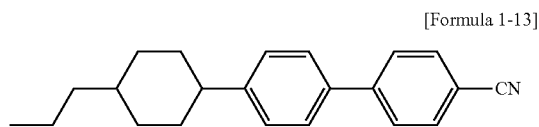
[Formula 1-14]
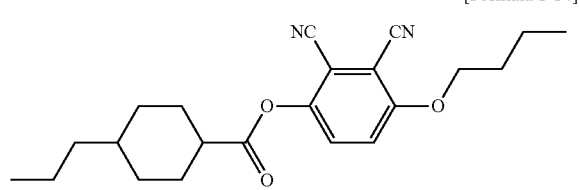
[Formula 1-15]
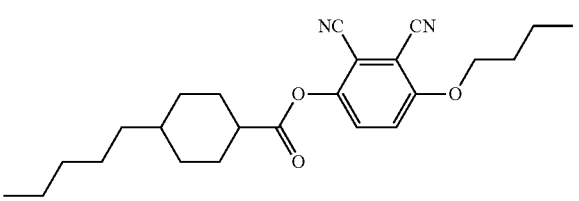
[Formula 1-16]
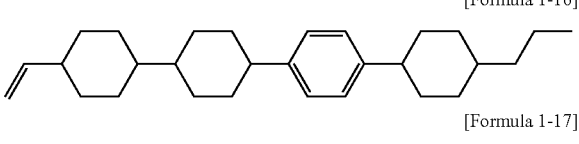
[Formula 1-17]
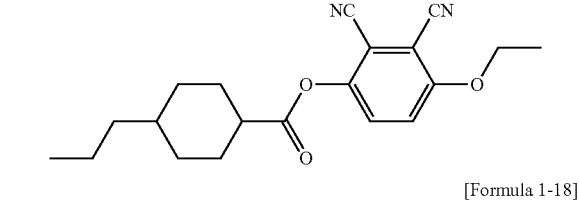
[Formula 1-18]
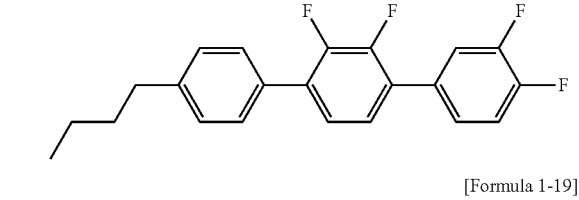
[Formula 1-19]
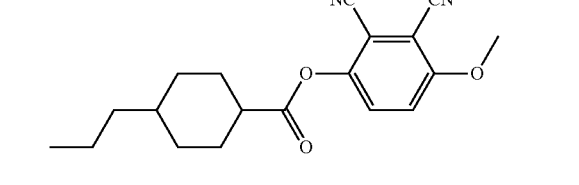
[Formula 1-20]
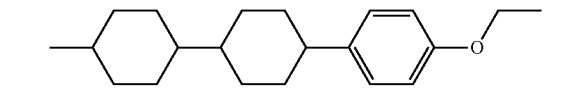
[Formula 1-21]
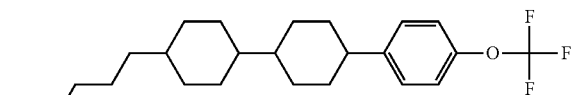
[Formula 1-22]
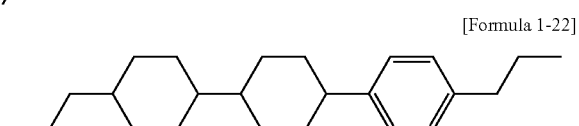
[Formula 1-23]
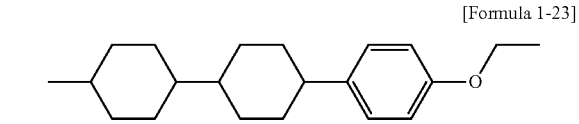
[Formula 1-24]
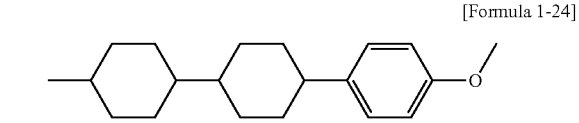
[Formula 1-25]
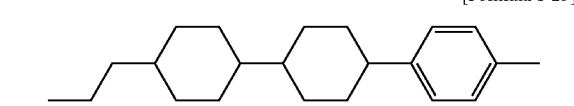
[Formula 1-26]
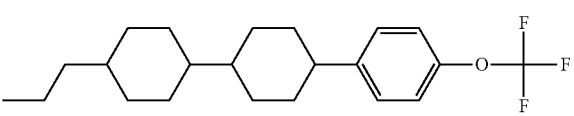
[Formula 1-27]
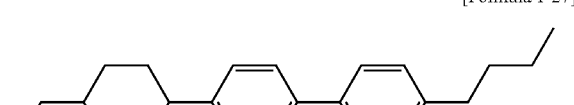
[Formula 1-28]
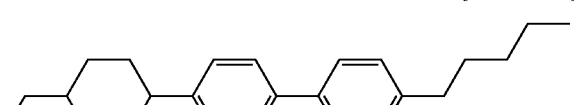
[Formula 1-29]
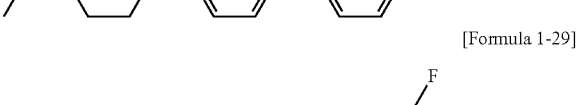
[Formula 1-30]
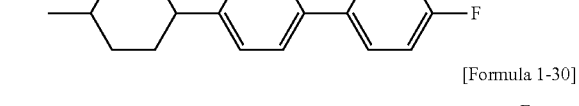
[Formula 1-31]
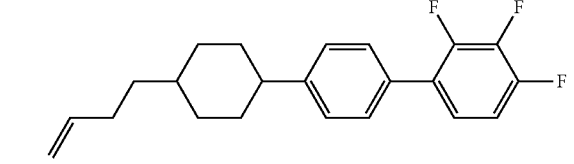

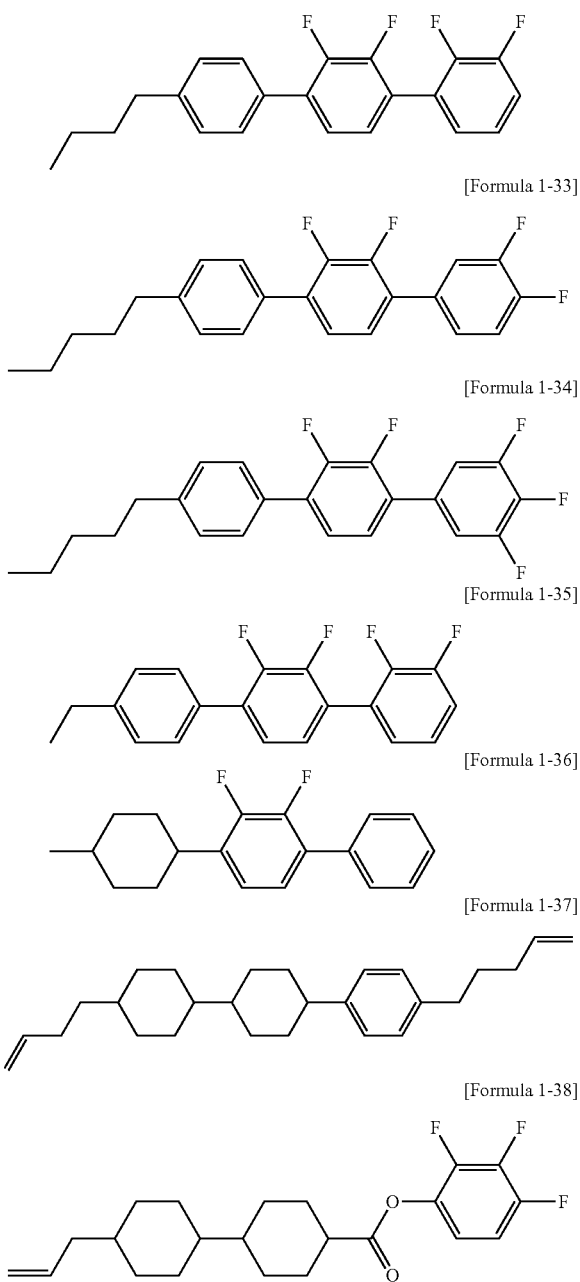

A dielectric anisotropy of the liquid crystal compound can be appropriately selected within a range that does not impair the purpose of the present application. In this specification, the term "dielectric anisotropy ($\Delta\varepsilon$)" means difference ($\varepsilon_{//}-\varepsilon_{v}$) between a horizontal permittivity ($\varepsilon_{//}$) and a vertical permittivity ($\varepsilon_{v}$) of the liquid crystal compound. In this specification, the term "horizontal permittivity ($\varepsilon_{//}$)" means a value of permittivity measured along a direction of an electric field in a state of applying a voltage so that the direction of the electric field by the applied voltage is substantially horizontal with the optical axis of the liquid crystal compound, and the term "vertical permittivity ($\varepsilon_{v}$)" means a value of permittivity measured along a direction of an electric field in a state of applying a voltage so that the direction of the electric field by the applied voltage is substantially vertical with the optical axis of the liquid crystal compound. While describing the permittivity in this specification, unless particularly noted, it may mean a value measured in a state of applying an electric field with a frequency of 1 kHz and a voltage of 0.1 V.

In addition, the term "optical axis" herein may mean an axis in the long axis direction of the liquid crystal compound when the liquid crystal compound has a rod shape, and mean an axis in the normal direction of the discotic plane when the liquid crystal compound has a discotic shape. Also, in this specification, the term "vertical alignment" may mean that the optical axis of the liquid crystal compound has an inclined angle of about 90 to 65 degrees, about 90 to 75 degrees, about 90 to 80 degrees, about 90 to 85 degrees or about 90 degrees for the plane of the liquid crystal layer, and "horizontal alignment" may mean that the optical axis of the liquid crystal compound has an inclined angle of about 0 to 25 degrees, about 0 to 15 degrees, about 0 to 10 degrees, about 0 to 5 degrees or 0 degrees for the plane of the liquid crystal layer.

In one example, the dielectric anisotropy ($\Delta\varepsilon$) of the liquid crystal compound may be negative. In this case, the absolute value of the dielectric anisotropy ($\Delta\varepsilon$) of the liquid crystal compound may be, for example, within a range of about 1 to 20. The lower limit of the absolute value of the dielectric anisotropy ($\Delta\varepsilon$) in the liquid crystal compound may be at least 1, at least 2, at least 3, at least 4, at least 5, at least 6, at least 7, at least 8, or at least 9, and the upper limit of the absolute value of the dielectric anisotropy ($\Delta\varepsilon$) may be 20 or less, 19 or less, 18 or less, 17 or less, 16 or less, 15 or less, 14 or less, 13 or less, 12 or less or 11 or less. When the dielectric anisotropy of the liquid crystal compound satisfies the above range, it is advantageous to realize a liquid crystal cell switching between the transparent mode and the scattering mode.

The non-ionic compound can control the conductivity of the liquid crystal layer to realize EHDI characteristics in the liquid crystal layer. Accordingly, the liquid crystal compound can convert the arrangement from a regularly arranged state, for example, a transparent mode as described below into an irregularly arranged state, for example, a scattering mode as described below.

The term "non-ionic compound" herein means a conceptual compound except for salt type compounds in which cations and anions are formed by electrical characteristics. In the present application, when a non-ionic compound is used as a liquid crystal additive for inducing EHDI, the solubility of the liquid crystal additive can be secured in the liquid crystal medium of the liquid crystal layer. When a salt is used as a liquid crystal additive for realizing the EHDI characteristics, there is a problem that it is difficult to secure solubility of the salt in the liquid crystal layer. If the appropriate solubility of the liquid crystal additive in the liquid crystal layer is not ensured, this may become a defect in the liquid crystal cell, and for example, there is a problem that when the liquid crystal cell embodies the transparent mode, the transmittance is decreased or the haze is increased. According to the present application, since a non-ionic compound is used instead of a salt as a liquid crystal additive for realizing EHDI characteristics, the above problems can be solved.

In one example, the non-ionic compound may include a high dielectric constant material having a dielectric constant of 3 or higher. The high dielectric constant material existing in the liquid crystal layer can control the conductivity of the liquid crystal layer to induce EHDI in the liquid crystal compound. Accordingly, the liquid crystal compound can convert the arrangement from a regularly arranged state, for example, a transparent mode as described below into an irregularly arranged state, for example, a scattering mode as described below. The higher the dielectric constant of the non-ionic compound, the liquid crystal cell of the present application exhibits more excellent haze characteristics.

The dielectric constant of the high dielectric constant material may be, for example, 3 or more, 5 or more, 10 or more, 15 or more, 20 or more, 25 or more, 30 or more, 35 or more, 40 or more, 45 or more, 50 or more, 55 or more, 60 or more, or 65 or more. For example, the upper limit of the dielectric constant of the high dielectric constant material is 200 or less, 190 or less, 180 or less, 170 or less, 160 or less, 150 or less, 140 or less, 130 or less, 120 or less, 110 or less, or 100 or less. The method of measuring the dielectric constant of the high dielectric constant material is not particularly limited and can be measured by a known dielectric constant measurement method at room temperature. In this specification, while describing the dielectric constant of the high dielectric constant materials, unless particularly noted, the dielectric constant disclosed in Handbook of Organic Solvents (David R. Lide/CRC Press/Dec. 1, 1994) can be referenced. Also, in this specification, while describing a plurality of dielectric constants of non-ionic compounds, unless particularly noted, the dielectric constants mean values measured by the same dielectric constant measurement method at room temperature. The term "room temperature" herein is a temperature in its natural state to be not heated or cooled, which may mean any one temperature within a range of about 15° C. to 40° C., for example, a temperature of about 20° C., about 25° C. or about 30° C.

As the high dielectric constant material, any non-ionic compound representing the aforementioned dielectric constant value can be used without any particular limitation. In one example, the non-ionic compound may comprise one or more selected from the group consisting of alkylene carbonate compounds, lactone compounds, dioxilane compounds, sulfolane compounds and alkyl aniline compounds. More specifically, as the non-ionic compound, ethylene carbonate, propylene carbonate, butylene carbonate, gamma butyrolactone, 1,3-dioxilane, sulfolane, N,N-dimethylaniline and the like can be used, but is not limited thereto.

A ratio of the high dielectric constant material in the liquid crystal layer can be appropriately selected in consideration of the desired physical properties, for example, the property of causing irregular alignment of the liquid crystal compound, and the like. The high dielectric constant material may be included in the liquid crystal layer in a ratio of, for example, at least 0.01% by weight, at least 0.1% by weight, at least 1% by weight, at least 2% by weight, at least 3% by weight, at least 4% by weight, at least 5% by weight, at least 8% by weight, or at least 9% by weight. The upper limit of the ratio of the high dielectric constant material in the liquid crystal layer may be, for example, 20% by weight or less, 19% by weight or less, 18% by weight or less, 17% by weight or less, 16% by weight or less, 15% by weight or less, 13 weight % or less, 12 weight % or less, or 11 weight % or less. When the ratio of the high dielectric constant material in the liquid crystal layer satisfies the above range, it is possible to realize a liquid crystal cell capable of switching between a transparent mode and a scattering mode having excellent haze characteristics. In addition, when a non-ionic compound is used, the solubility in the liquid crystal medium can be secured, and if necessary, a larger amount of liquid crystal additives can be freely used as compared to a salt type liquid crystal additive, so that the degree of freedom in manufacturing a liquid crystal cell is increased.

When the non-ionic compound is a high dielectric constant material, the liquid crystal layer may have conductivity to the extent capable of realizing EHDI characteristics. In one example, the horizontal conductivity ($\sigma_{//}$) of the liquid crystal layer may be $1.0 \times 10^{-7}$ S/m or more.

In this specification, the horizontal conductivity ($\sigma_{//}$) of the liquid crystal layer may mean a conductivity value measured along the direction of the electric field in a state where a voltage is applied so that the direction of the electric field by the applied voltage is substantially horizontal with the optical axis of the liquid crystal layer. In one specific example, when the nematic liquid crystal has a rod shape, it means a conductivity value measured along an electric field direction by applying a voltage so that the electric field is formed along the thickness direction of the liquid crystal layer in a state where the long axis of the nematic liquid crystal is parallel to the thickness direction of the liquid crystal layer, that is a state of vertical alignment.

In this specification, the "vertical conductivity ($\sigma_\perp$)" of the liquid crystal layer means a conductivity value measured along the direction of the electric field in a state where a voltage is applied so that the direction of the electric field by the applied voltage is substantially vertical with the optical axis of the liquid crystal layer. In one specific example, when the nematic liquid crystal has a rod shape, it means a conductivity value measured along an electric field direction by applying a voltage so that the electric field is formed along the thickness direction of the liquid crystal layer in a state where the long axis of the nematic liquid crystal is perpendicular to the thickness direction of the liquid crystal layer, that is a state of horizontal alignment.

In this specification, the conductivity value of the liquid crystal layer having a unit of S/m may mean a conductivity (unit: S/m) measured for a liquid crystal cell having an area of 2.2 cm×4.0 cm and an interval of 9 m under an application condition of a voltage of 0.5 V and a frequency of 60 Hz at room temperature. In this specification, the conductivity value of a liquid crystal layer having a unit of S/cm may mean a conductivity value obtained by converting the measured conductivity based on a liquid crystal cell having an area of 1 cm$^2$ and an interval of 1 cm.

When the non-ionic compound is a high dielectric constant material, the horizontal conductivity ($\sigma_{//}$) of the liquid crystal layer may be, more specifically, $1.0 \times 10^{-6}$ S/m or more, $2.0 \times 10^{-6}$ S/m or more, $3.0 \times 10^{-6}$ S/m or more, $4.0 \times 10^{-6}$ S/m or more, $5.0 \times 10^{-6}$ S/m or more, $6.0 \times 10^{-6}$ S/m or more, or $7.0 \times 10^{-6}$ S/m or more. When the horizontal conductivity ($\sigma_{//}$) of the liquid crystal layer satisfies the above range, the EHDI characteristics can be effectively exhibited by applying external energy to the liquid crystal layer. The upper limit of the horizontal conductivity ($\sigma_{//}$) in the liquid crystal layer may be appropriately selected within a range that does not impair the desired physical properties, and for example, may be $1.0 \times 10^{-1}$ S/m or less, $1.0 \times 10^{-2}$ S/m or less, $1.0 \times 10^{-3}$ S/m or less, $9.0 \times 10^{-4}$ S/cm or less, or $5.0 \times 10^{-4}$ S/cm or less. The horizontal conductivity ($\sigma_{//}$) of the liquid crystal layer can be controlled to the above value range by adjusting the dielectric constant or the content of the high dielectric constant material present in the liquid crystal layer. Or it can be also controlled by appropriately adding an additive such as a monomer having a reactive functional group, an initiator, or an anisotropic dye in the liquid crystal layer.

When the non-ionic compound is a high dielectric constant material, the horizontal conductivity ($\sigma_{//}$) of the liquid crystal layer can exhibit a linear relationship with respect to the dielectric constant ($\varepsilon$) of the non-ionic compound. Therefore, the higher the dielectric constant of the non-ionic compound, the horizontal conductivity ($\sigma_{//}$) of the liquid crystal layer increases, and thus, EHDI characteristics can be effectively represented when external energy is applied to the liquid crystal layer and accordingly, the liquid crystal cell can exhibit excellent haze characteristics.

When the non-ionic compound is a high dielectric constant material, the liquid crystal cell may satisfy a relationship of Equation 1 below.

$$y = 1E\text{-}07x + 4E\text{-}07 \geq 1.0 \times 10^{-5}$$ [Equation 1]

In Equation 1 above, y represents the horizontal conductivity ($\sigma_{//}$) (unit: S/m) of the liquid crystal layer and x represents the dielectric constant ($\varepsilon$) of the non-ionic compound (provided that the ratio of the non-ionic compound in the liquid crystal layer is 10% by weight).

The content of the horizontal conductivity ($\sigma_{//}$) of the liquid crystal layer as described above may be same applied to the details of the horizontal conductivity ($\sigma_{//}$) of the liquid crystal layer representing y in Equation 1 above. Also, the relationship of Equation 1 may have an accuracy of about 95% or more, about 96% or more, about 97% or more, about 98% or more, or about 99% or more.

In another example, the non-ionic compound may comprise a reactive mesogen. The reactive mesogen can control the conductivity of the liquid crystal layer to realize EHDI characteristics. Accordingly, the liquid crystal compound can convert the arrangement from a regularly arranged state, for example, a transparent mode as described below into an irregularly arranged state, for example, a scattering mode as described below.

The reactive mesogen has a structure similar to the liquid crystal compound, particularly the nematic phase liquid crystal compound, and optically anisotropic properties, for example, different conductivities toward the long axis direction and the short axis direction of the molecule, and thus may reduce in-plane unevenness due to difference between solubility for liquid crystals and dispersion property with liquid crystals, as well as control the conductivity of the liquid crystal layer to realize EHDI characteristics, and is advantageous to provide a liquid crystal cell having excellent driving voltage and haze characteristics, as well as improves a mixing property with liquid crystals to have excellent storage reliability.

In this specification, the reactive mesogen may mean a compound containing a moiety capable of exhibiting liquid crystallinity, for example, a mesogenic backbone, and also containing at least one reactive functional group. As the reactive functional group, for example, a polymerizable functional group or a crosslinkable functional group can be exemplified.

The reactive mesogen may comprise a polyfunctional reactive mesogen or a monofunctional reactive mesogen. The term "polyfunctional reactive mesogen" herein may refer to a compound containing two or more reactive functional groups among the mesogens. In one example, the polyfunctional reactive mesogen may comprise 2 to 10, 2 to 8, 2 to 6, 2 to 5, 2 to 4, 2 to 3 or 2 reactive functional groups. In addition, the term "monofunctional reactive mesogen" may mean a compound comprising one reactive functional group among the mesogens.

The reactive mesogen may include a compound represented by Formulas 2 to 5 below.

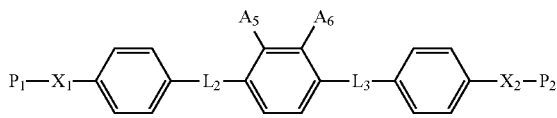
[Formula 2]

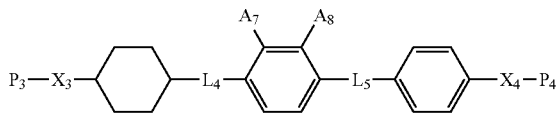
[Formula 3]

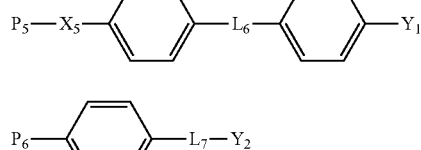
[Formula 4]

[Formula 5]
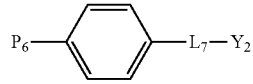

In Formulas 2 to 5, $P_1$ to $P_6$ represent independently of each other a (meth)acrylate group, a carboxyl group, a hydroxy group, a vinyl group, an epoxy group or a nitro group, $X_1$ to $X_5$ represent independently of each other a single bond, a substituted or unsubstituted alkyl group having 1 to 10 carbon atoms or a substituted or unsubstituted alkoxy group having 1 to 10 carbon atoms, $L_2$ to $L_7$ represent independently of each other a single bond, a substituted or unsubstituted alkylene group having 1 to 10 carbon atoms, a substituted or unsubstituted alkenylene group having 1 to 10 carbon atoms, a substituted or unsubstituted alkoxylene group having 1 to 10 carbon atoms, —O— or

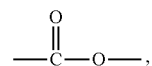

$A_5$ to $A_8$ represent independently of each other hydrogen, halogen, a cyano group, a substituted or unsubstituted alkyl group having 1 to 3 carbon atoms or a substituted or unsubstituted alkoxy group having 1 to 2 carbon atoms, $Y_1$ to $Y_2$ represent independently of each other hydrogen, halogen, a cyano group, a substituted or unsubstituted alkyl group having 1 to 10 carbon atoms, or an alkoxy group having 1 to 10 carbon atoms unsubstituted or substituted with at least one substituent selected from the group consisting of a cyano group, halogen and an alkenyl group.

According to one embodiment of the present application, in Formulas 2 to 5, $P_1$ to $P_6$ each may be a (meth)acrylate group.

According to one embodiment of the present application, in Formulas 2 to 4, $X_1$ to $X_5$ each may be an unsubstituted alkoxylene group having 1 to 10 carbon atoms, specifically, an unsubstituted alkoxylene group having 1 to 6 carbon atoms, and more specifically, an unsubstituted alkoxylene group having 1 to 3 carbon atoms.

According to one embodiment of the present application, in Formulas 2 to 5, $L_2$ to $L_7$ each may be

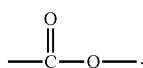

According to one embodiment of the present application, in Formulas 2 to 3, As to $A_8$ may be independently of each other hydrogen or a methyl group.

According to one embodiment of the present application, in Formulas 4 to 5, $Y_1$ to $Y_2$ each may be a cyano group or an unsubstituted alkoxy group having 1 to 10 carbon atoms. More specifically, $Y_1$ in Formula 4 may be a cyano group or an unsubstituted alkoxy group having 6 to 8 carbon atoms.

According to one embodiment of the present application, as the reactive mesogen a compound of Formula 2 above may be used, and for example, a compound of Formula 2-1 or 2-2 below may be used.

the reactive mesogen may be included in a ratio of at least 0.1 part by weight, at least 1 part by weight, at least 2 parts by weight, at least 3 parts by weight, at least 4 parts by weight, at least 5 parts by weight, at least 6 parts by weight, at least 7 parts by weight, at least 8 parts by weight, at least 9 parts by weight or at least 10 parts by weight, and in a ratio of not more than 30 parts by weight, not more than 28 parts by weight, not more than 26 parts by weight, not more than 24 parts by weight, not more than 22 parts by weight, not more than 18 parts by weight, not more than 16 parts by weight, not more than 14 parts by weight, or not more than 12 parts by weight, relative to 100 parts by weight of the liquid crystal compound. When the reactive mesogen ratio satisfies the above range, it is possible to provide the liquid crystal cell having excellent driving voltage characteristics and haze characteristics by realizing the desired physical properties effectively. In addition, as described above, when a non-ionic compound is used, the solubility in the liquid crystal medium can be secured, and if necessary, a larger

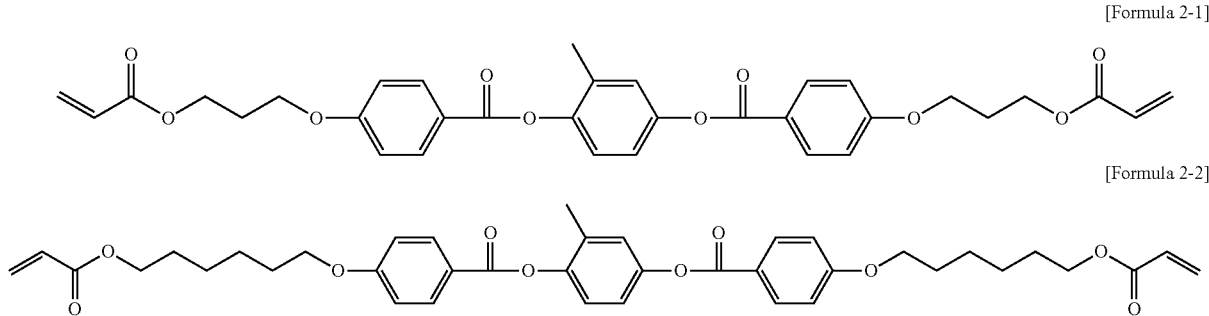

[Formula 2-1]

[Formula 2-2]

According to another embodiment of the present application, as the reactive mesogen the compound of Formula 4 above can be used, and for example, the compounds of Formulas 4-1 to 4-3 below can be used.

amount of liquid crystal additives can be freely used as compared to a salt type liquid crystal additive, so that the degree of freedom in manufacturing a liquid crystal cell is increased.

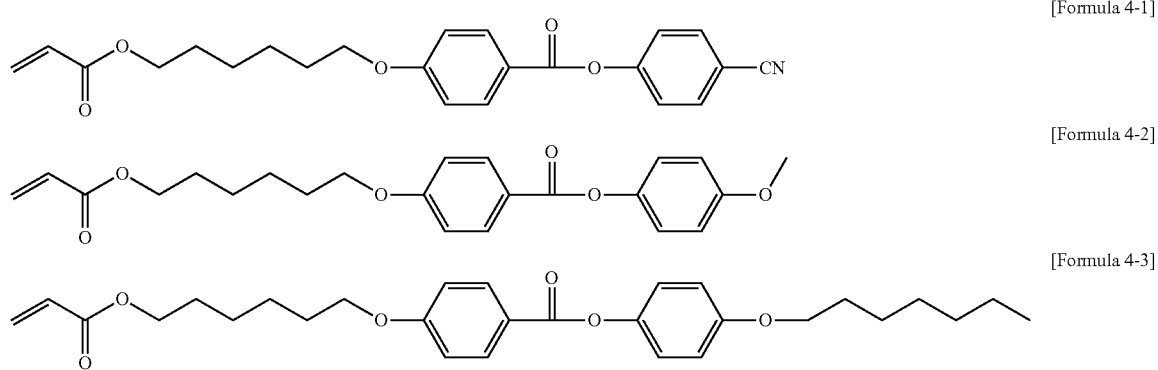

[Formula 4-1]

[Formula 4-2]

[Formula 4-3]

The ratio of the reactive mesogen in the liquid crystal layer can be appropriately selected in consideration of the desired properties, for example, a property to realize EHDI characteristics by controlling the conductivity of the liquid crystal layer, a property to improve the mixing property with the nematic liquid crystals, and the like.

In one example, the reactive mesogen may be included in a proportion of 0.1 to 30 parts by weight relative to 100 parts by weight of the liquid crystal compound. More specifically, When the non-ionic compound is a high dielectric constant material, the liquid crystal layer may have conductivity to the extent capable of realizing EHDI characteristics. In one example, the measured horizontal conductivity ($\sigma_{//}$) of the liquid crystal layer may be $1.0 \times 10^{-7}$ S/m or more. For the horizontal conductivity ($\sigma_{//}$) of the liquid crystal layer, the content described in the item of the high dielectric constant material may be same applied.

When the non-ionic compound is a reactive mesogen, the horizontal conductivity ($\sigma_{//}$) or the vertical conductivity ($\sigma_\perp$) of the liquid crystal layer may be $1.0\times10^{-4}$ S/cm or more. More specifically, a horizontal conductivity ($\sigma_\perp$) or a vertical conductivity ($\sigma_\perp$) of the liquid crystal layer may be at least $9.5\times10^{-5}$ S/cm, at least $1.0\times10^{-4}$ S/cm, at least $5.0\times10^{-4}$ S/cm or more, at least $1.0\times10^{-3}$ S/cm, or at least $1.0\times10^{-2}$ S/cm. When the horizontal conductivity ($\sigma_{//}$) or the vertical conductivity ($\sigma_\perp$) of the liquid crystal layer is adjusted to the above value range, the EHDI characteristics can be effectively implemented in the liquid crystal layer. The upper limit of the horizontal conductivity ($\sigma_{//}$) or the vertical conductivity ($\sigma_\perp$) of the liquid crystal layer can be appropriately selected within a range that does not impair the desired physical properties, and for example, may be $1.0\times10^{-2}$ S/cm or less, $1.0\times10^{-3}$ S/cm or less, $9.0\times10^{-4}$ S/cm or less, or $5.0\times10^{-4}$ S/cm or less. The horizontal conductivity ($\sigma_{//}$) or the vertical conductivity ($\sigma_\perp$) of such a liquid crystal layer can be realized by controlling the type and content of the reactive mesogen or adding a small amount of the ionic compound. Or, it can be also controlled by appropriately adding an additive such as an initiator or an anisotropic dye in the liquid crystal layer.

When the non-ionic compound is a reactive mesogen, the ratio of the vertical conductivity ($\sigma_\perp$) and the horizontal conductivity ($\sigma_{//}$) of the liquid crystal layer can be appropriately adjusted in consideration of the physical properties of the desired liquid crystal cell. For example, the ratio ($\sigma_{//}/\sigma_v$) of the horizontal conductivity ($\sigma_{//}$) to the vertical conductivity ($\sigma_\perp$) of the liquid crystal layer may be 0.2 or more, 0.4 or more, 0.6 or more, 0.8 or more, 1.0 or more, 1.25 or more, 1.5 or more, 1.75 or more, 2.0 or more, 2.25 or more, 2.5 or more, 2.75 or more, or 3.0 or more. The vertical conductivity ($\sigma_{//}$) and the horizontal conductivity ($\sigma_{//}$) may mean each value of the converted vertical conductivity ($\sigma_\perp$) and horizontal conductivity ($\sigma_{//}$). When the non-ionic compound is a reactive mesogen and the ratio of the vertical conductivity ($\sigma_\perp$) and the horizontal conductivity ($\sigma_{//}$) of the liquid crystal layer is controlled within the above value range, the liquid crystal cell exhibits a low driving voltage and haze characteristics, and moreover it is advantageous to implement a liquid crystal cell switching between the transparent mode and the scattering mode.

When the non-ionic compound is a reactive mesogen, the upper limit of the ratio ($\sigma_{//}/\sigma_\perp$) of the horizontal conductivity ($\sigma_{//}$) to the vertical conductivity ($\sigma_\perp$) of the liquid crystal layer may be appropriately selected within a range that does not impair the desired physical properties and may be, for example, not more than 7, not more than 6, not more than 5, not more than 4, not more than 3, not more than 2, or not more than 1.5, but is not limited thereto. Such a ratio ($\sigma_{//}/\sigma_\perp$) of the horizontal conductivity ($\sigma_{//}$) to the vertical conductivity ($\sigma_\perp$) can be realized by adjusting the type and content of the reactive mesogen or by adding a small amount of the ionic compound. Or, it can be also controlled by appropriately adding an additive such as an initiator or an anisotropic dye in the liquid crystal layer.

The liquid crystal layer may further include an anisotropic dye. The anisotropic dye can improve the transmittance variable characteristics of the liquid crystal cell, for example, by reducing the transmittance in the scattering mode. In this specification, the term "dye" may mean a material capable of intensively absorbing and/or modifying light in at least some or all ranges within a visible light region, for example, a wavelength range of 400 nm to 700 nm, and the term "anisotropic dye" may mean a material allowing anisotropic absorption of light in at least some or all ranges of the visible light region.

As the anisotropic dye, for example, known dyes may be selected and used, which are known to have properties that can be aligned according to the alignment state of liquid crystals. As the anisotropic dye, for example, a black dye can be used. Such dyes are known, for example, as azo dyes or anthraquinone dyes, and the like, but are not limited thereto.

By using the non-ionic compound as an additive for realizing EHDI characteristics in the present application, discoloration is low on adding the anisotropic dye, compared to the case where only ionic compounds are conventionally used, so that the transmittance variable characteristics may be more maximized.

The content of the anisotropic dye may be suitably selected in consideration of the object of the present application. In one example, the anisotropic dye may be included in a ratio of 0 to 3 parts by weight relative to 100 parts by weight of the liquid crystal compound. Specifically, the anisotropic dye may be included in a ratio of more than 0 parts by weight, 0.1 parts by weight or more, 0.2 parts by weight or more, 0.4 parts by weight or more, 0.6 parts by weight or more, 0.8 parts by weight or more, or 1.0 parts by weight or more and in a ratio of less than 3 parts by weight, 2.5 parts by weight or less, 2.0 parts by weight or less, 1.5 parts by weight or less, or 1.2 parts by weight or less, relative to 100 parts by weight of the liquid crystal compound.

The liquid crystal layer may further comprise an ionic compound. In this case, the ionic compound may be contained in a smaller amount compared to the non-ionic compound. When the liquid crystal layer further comprises a small amount of the ionic compound, it is easy to realize the EHDI characteristics and adjust the haze through controlling the conductivity. In addition, when the liquid crystal layer further comprises a small amount of the ionic compound, the driving voltage reduction characteristic can be ensured. When the liquid crystal layer further comprises an ionic compound, a filtering process may be required to remove the insoluble ionic compound (salt).

When the liquid crystal layer further comprises an ionic compound, the non-ionic compound may be contained in a ratio of 0.1 to 15 parts by weight relative to 100 parts by weight of the liquid crystal compound, and the ionic compound may be further included in a ratio of 0.01 to 5 parts by weight relative to 100 parts by weight of the liquid crystal compound.

In this specification, an ionic compound may mean a salt type compound in which ions having opposite charges to each other, for example, a cation and an anion are made up by an ionic bond. The ionic compound may be electrically neutral. An example of such an ionic compound may include, a nitrogen-containing onium salt, a sulfur-containing onium salt, or a phosphorus-containing onium salt, but is not limited thereto.

In one example, the ionic compound may include a monovalent cation and a monovalent anion.

In one example, the monovalent cation may be represented by any one of the Formulas 6 to 9.

[Formula 6]

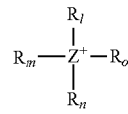

In Formula 6, Z is a nitrogen, sulfur or phosphorus atom, and $R_l$, $R_m$, $R_n$ and $R_o$ are each independently hydrogen or a monovalent hydrocarbon group having 1 to 20 carbon atoms, provided that when Z is a sulfur atom, $R_o$ is not present.

[Formula 7]

In Formula 7, $R_a$ is a divalent hydrocarbon group having 4 to 20 carbon atoms, $R_b$ and $R_c$ are each hydrogen or a monovalent hydrocarbon group having 1 to 20 carbon atoms, provided that when the nitrogen atom (N) contains a double bond, $R_b$ or $R_c$ is not present.

[Formula 8]

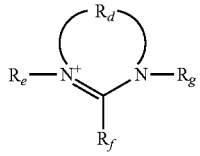

In Formula 8, $R_d$ is a divalent hydrocarbon group having 2 to 20 carbon atoms, and $R_e$, $R_f$ and $R_g$ are each hydrogen or a monovalent hydrocarbon group having 1 to 20 carbon atoms.

[Formula 9]

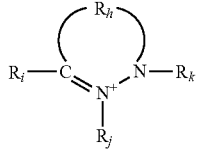

In Formula 9, $R_h$ is a divalent hydrocarbon group having 2 to 20 carbon atoms, and $R_i$, $R_j$ and $R_k$ are each hydrogen or a monovalent hydrocarbon group having 1 to 20 carbon atoms.

In Formulas 6 to 9 above, the hydrocarbon group has a meaning including a saturated hydrocarbon group and an unsaturated hydrocarbon group, and the hydrocarbon group may also include two or more of a carbon-carbon single bond, a carbon-carbon double bond and a carbon-carbon triple bond in combination thereof. In addition, in Formulas 6 to 9 above, the hydrocarbon group may be a meaning including a straight or branched hydrocarbon group. In addition, in Formulas 6 to 9 above, the hydrocarbon group may also contain a hetero atom, if necessary. Also, in Formula 7 above, any one of $R_b$ and $R_c$ may be linked to any one carbon in $R_a$ to form a hydrocarbon ring structure.

An example of the monovalent anion may include fluorine (F) anion, bromine (Br) anion, chlorine (Cl) anion, iodine (I), $ClO_4$ anion, $PF_4$ anion, $PF_6$ anion, $PB_6$ anion or $BF_4$ anion, but is not limited thereto.

The liquid crystal cell of the present application can switch between the transparent mode and the scattering mode by adjusting the initial alignment state of the liquid crystal compound and applying external energy such as a voltage. For example, when the liquid crystal compound exists in an aligned state, the liquid crystal cell may exhibit a transparent mode, and when the liquid crystal compound exists in an irregularly arranged state, the liquid crystal cell may exhibit a scattering mode.

In this specification, the term "scattering mode" may mean a mode in which the liquid crystal cell exhibits haze above a predetermined level, and the term "transparent mode" may mean a mode in which it exhibits a light permeable state or haze below a predetermined level.

For example, in the scattering mode, the liquid crystal cell may have a haze of 10% or more, 15% or more, 20% or more, 25% or more, 30% or more, 35% or more, 40% or more, 45% or more, 50% or more, 60% or more, 65% or more, 70% or more, 75% or more, 80% or more, 85% or more, 90% or more or 95% or more. In the transparent mode, for example, the liquid crystal cell may have a haze of less than 10%, 8% or less, 6% or less, or 5% or less.

In one example, the liquid crystal layer can switch between a transparent mode (or a non-haze mode) having a haze of less than 10% and a scattering mode (or a haze mode) having a haze of 10% or more.

In one example, the liquid crystal cell is in a transparent mode in the state where no external energy is applied, and can be switched to a scattering mode when external energy is applied.

In one example, nematic liquid crystals in the liquid crystal cell may be present in a vertically aligned state in a state in which no external energy is applied.

FIG. 1 illustratively shows driving of a liquid crystal cell using a liquid crystal compound having a negative dielectric anisotropy. As shown in FIG. 1, in an initial state, that is, in a state in which external energy is not applied, the liquid crystal compound (1021) can exist in a state vertically aligned with respect to the plane of the liquid crystal layer (101), and can realize the transparent mode (A). In this case, in order to control the initial alignment state of the liquid crystal compound (1021), a vertical alignment film described later may exist on both sides of the liquid crystal layer (101). In such an initial state, when external energy, for example, a vertical electric field is applied, the liquid crystal compound (1021) may be converted into the scattering mode (B) by having an irregular arrangement state due to EHDI caused by a non-ionic compound (not shown) as a liquid crystal additive.

In one example, if the liquid crystal compound is a nematic phase, it can be converted to the transparent mode of the initial state when the vertical electric field is removed. In another example, if the liquid crystal compound is a smectic phase, for example, a semectic A phase, the scattering mode can be maintained even when the vertical electric field is removed. That is, when using liquid crystals of the nematic phase, the liquid crystal cell can realize a monostable mode, and when using liquid crystals of the smectic phase, the liquid crystal cell can realize a bistable mode. In this specification, the term "monostable mode" means a mode in which application of external energy is continuously required to maintain at least any one state of the liquid crystal states, and the term "bistable mode" means a mode in which application of external energy is required only on changing the state.

The conversion from the transparent mode to the scattering mode can be performed, for example, by applying a low frequency vertical electric field within a range of about 1 Hz to 500 Hz. In addition, when the liquid crystal compound is a smectic phase, application of an electric field having a relatively high frequency, for example, at least 1 kHz high frequency may be needed to convert from the scattering mode to the transparent mode. However, the frequency range of the applied electric field is not limited to the above, but may be suitably changed in consideration of the desired properties, for example, the haze characteristic or the transmission characteristic of each mode.

The liquid crystal cell may further comprise two substrates disposed opposite to both sides of the liquid crystal layer. In this case, as shown in FIG. 2, the liquid crystal cell (1) may comprise the oppositely disposed two substrates (201A, 201B) and the liquid crystal layer (101) present between the oppositely disposed two substrates (201A, 201B).

As the substrate, the known materials can be used without any particular limitation. For example, inorganic films such as glass films, crystalline or amorphous silicon films, and quartz or ITO (indium tin oxide) films, or plastic films can be used. As the substrate, an optically isotropic substrate, an optically anisotropic substrate like a retardation layer, a polarizing plate, a color filter substrate, or the like can be used.

As the plastic substrate, a substrate comprising TAC (triacetyl cellulose); COP (cyclo olefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylenemaphthatlate); PET (polyethyleneterephtalate); PI (polyimide); PSF (polysulfone); PAR (polyarylate) or an amorphous fluorine resin may be used, without being limited thereto. A coating layer of gold, silver, or a silicon compound such as silicon dioxide or silicon monoxide, or a coating layer such as an antireflection layer may be also present on the substrate, if necessary.

The liquid crystal cell may further comprise two electrode layers disposed opposite to both sides of the liquid crystal layer. In this case, the liquid crystal cell may comprise the oppositely disposed two electrode layers and the liquid crystal layer present between the oppositely disposed two electrode layers. When the liquid crystal layer comprises both the oppositely disposed two substrates and the oppositely disposed two electrode layers, as shown in FIG. 3, the liquid crystal cell (2) may be disposed to be closer to the liquid crystal layer (101) in order of the electrode layers (301A, 301B) and the substrates (201A, 201B).

The electrode layer can apply a vertical or horizontal electric field to the liquid crystal layer so that the alignment state of the liquid crystal compound in the liquid crystal layer can be converted. The electrode layer can be formed by depositing, for example, a conductive polymer, a conductive metal, a conductive nanowire, or a metal oxide such as ITO (Indium Tin Oxide). The electrode layer may be formed to have transparency. In this field, various materials and forming methods capable of forming a transparent electrode layer are known, and all of these methods can be applied. If necessary, the electrode layer formed on the surface of the substrate may be appropriately patterned.

The liquid crystal cell may further comprise two vertical alignment films disposed opposite to both sides of the liquid crystal layer. In this case, the liquid crystal cell may comprise the oppositely disposed two vertical alignment films and the liquid crystal layer present between the oppositely disposed two vertical alignment films. When the liquid crystal layer comprises all the oppositely disposed two substrates, the oppositely disposed two electrode layers and the oppositely disposed two vertical alignment films, as shown in FIG. 4, the liquid crystal cell (3) may be disposed to be closer to the liquid crystal layer (10) in order of the vertical alignment films (401A, 401B), the electrode layers (301A, 301B) and the substrates (201A, 201B).

As long as the vertical alignment film is an alignment film having vertical alignment ability with respect to the liquid crystal compound of the adjacent liquid crystal layer, it can be used without any particular limitation. As such an alignment film, for example, a contact type alignment film such as a rubbing alignment film or an alignment film known that it comprises a photo-alignment film compound and thus may exhibit orientation characteristics by a contactless method such as irradiation of linearly polarized light, can be used.

The present application also relates to a use of a liquid crystal cell. The exemplary liquid crystal cell switches between the transparent mode and the scattering mode, and particularly has excellent haze characteristics in the scattering mode. Such a liquid crystal cell can be usefully used in a light modulation device. An example of the light modulation device may include, but is not limited to, a smart window, a window protective film, a flexible display device, an active retarder for 3D image display, or a viewing angle adjusting film. The method of configuring the light modulation device as above is not particularly limited, and as long as the liquid crystal cell is used, a usual method can be applied.

Advantageous Effects

The present application can provide a liquid crystal cell which is capable of switching between a transparent mode and a scattering mode by using a non-ionic compound as a liquid crystal additive for realizing the EHDI characteristics and has excellent performance such as a driving voltage characteristic, a haze characteristic and reliability by securing solubility of the additive for liquid crystals. Such a liquid crystal cell can be applied to various light modulation devices such as a smart window, a window protective film, a flexible display device, a light shielding plate for transparent display, an active retarder for 3D image display, or a viewing angle adjusting film.

BRIEF DESCRIPTION OF DRAWINGS

FIG. 1 illustratively shows a driving method of the liquid crystal cell of the present application.

FIGS. 2 to 4 illustratively show the liquid crystal cell of the present application.

FIG. 5 shows the relationship between the dielectric constant of the liquid crystal additive of Examples 1 to 3 and the horizontal conductivity of the liquid crystal layer.

FIG. 6 shows the results evaluating the haze according to the voltages of Examples 1 to 3.

FIG. 7 shows the results evaluating the haze according to the voltages of Comparative Examples 1 and 2.

FIG. 8 shows the results evaluating the haze according to the voltages of Examples 5 and 9.

MODE FOR INVENTION

Hereinafter, the present invention will be described in more detail with reference to Examples and Comparative Examples, but the scope of the present application is not limited by the details set forth below.

Evaluation Example 1. Evaluation of Solubility Characteristics (1) The bottles of the liquid crystal compositions prepared in Examples and Comparative Examples were left at room temperature to observe recrystallization. When crystals adhered to the bottle wall are observed with the naked eye, it means that the storage characteristics at room temperature of the liquid crystal composition are not secured.

(2) The liquid crystal cells prepared in Examples and Comparative Examples were stored at room temperature and −20° C., respectively, to observe recrystallization. They were observed daily at room temperature for at least one month and observed at −20° C. after standing for at least 5 days. When crystals of the liquid crystal cell are observed with the naked eye, it means that the solubility characteristics are not secured.

<Evaluation Criteria for Solubility Characteristics>

O: Recrystallization during the above observations is not observed with the naked eye X: Recrystallization is observed with naked eyes even in any one of the above observations

Evaluation Example 2. Evaluation of Conductivity Characteristics

For the liquid crystal cells prepared in Examples and comparative Examples, the conductivity at room temperature was measured using a LCR meter (E4980A, Agilent) under a condition at a measuring frequency of 60 Hz and a measuring voltage of 0.5 V (unit: S/m). The horizontal conductivity ($\sigma_{//}$) was measured by applying a vertical voltage, that is a voltage in the thickness direction of the liquid crystal layer, to the vertically aligned liquid crystal layer, and the vertical conductivity ($\sigma_{\perp}$) was measured by applying also the vertical voltage to the horizontally aligned liquid crystal layer. The converted conductivity (unit: S/cm) can be obtained by converting the measured conductivity based on an area of 1 cm$^2$ and an interval of 1 cm.

Evaluation Example 3. Evaluation of Haze and Transmittance

For the liquid crystal cells prepared in Examples and Comparative Examples, while driving them by connecting an AC power source (frequency: 60 Hz) to the upper and lower ITO transparent electrode layers and applying the vertical electric field, the haze and transmittance according to voltages were measured using a haze meter, NDH-5000SP by an ASTM method. That is, light is transmitted through a measuring object and entered into an integrating sphere, and in this process, the light is divided into a diffusion light (DT, meaning the sum of all the diffused and emitted light) and a parallel light (PT, meaning the emitted light in the front direction excluding the diffusion light), where these lights are collected in light receiving elements in the integrating sphere, so that the haze may be measured through the collected light. That is, it may be defined that the total transmitted light (TT) by the above procedure is the sum (DT+PT) of the diffusion light (DT) and the parallel light (PT) and the haze is the percentage of the diffusion light to the total transmitted light (Haze (%)=100×DT/TT). In addition, in the following test example, the total transmittance refers to the total transmitted light (TT), and the rectilinear transmittance refers to the parallel light (PT).

Example 1

Preparation of DSM (Dynamic Scattering Mode) Liquid Crystal Composition

To 10 mL vial, 3.60 g of liquid crystals from HCCH company (HNG726200-100, dielectric anisotropy: −4.0, refractive index anisotropy: 0.225) and 0.40 g of propylene carbonate (dielectric constant at 20° C.: 66.14, Handbook of Organic Solvents R. Lide/CRC Press/Dec. 1, 1994)) (about 10% by weight) as a liquid crystal additive were added and then stirred at 100° C. for 24 hours to prepare a liquid crystal composition.

Preparation of DSM (Dynamic Scattering Mode) Liquid Crystal Cell

The liquid crystal composition as prepared above was injected into a glass test cell sequentially forming an ITO transparent electrode layer and a vertical alignment film on the inner side of the cell and having a cell interval of 9 m, using a capillary phenomenon to prepare a liquid crystal cell having an area of 2.2 cm×4.0 cm and an interval of 9 m.

Example 2

A liquid crystal cell was prepared by the same method as Example 1, except that in preparing the liquid crystal composition, 0.4 g (about 10% by weight) of sulfolane (dielectric constant at 30° C.: 43.26, Handbook of Organic Solvents (David R. Lide/CRC Press/Dec. 1, 1994)) was used instead of propylene carbonate as a liquid crystal additive.

Example 3

A liquid crystal cell was prepared by the same method as Example 1, except that in preparing the liquid crystal composition, 0.4 g (about 10% by weight) of N,N-dimethylaniline (dielectric constant at 25° C.: 4.90, Handbook of Organic Solvents (David R. Lide/CRC Press/Dec. 1, 1994)) was used instead of propylene carbonate as a liquid crystal additive.

Comparative Example 1

A liquid crystal cell was prepared by the same method as Example 1, except that in preparing the liquid crystal composition, 0.04 g (about 1% by weight) of CTAB (Cetyltrimethyl ammonium bromide, TCI) was used instead of propylene carbonate as a liquid crystal additive.

Comparative Example 2

A liquid crystal cell was prepared by the same method as Example 1, except that in preparing the liquid crystal composition, 0.04 g (about 1% by weight) of CTAC (Cetyltrimethyl ammonium chloride, TCI) was used instead of propylene carbonate as a liquid crystal additive.

Comparative Example 3

A liquid crystal cell was prepared by the same method as Example 1, except that in preparing the liquid crystal composition, 0.4 g (about 10% by weight) of CTAB (Cetyltrimethyl ammonium bromide, TCI) was used instead of propylene carbonate as a liquid crystal additive. In the case of Comparative Example 3, although the content of the liquid crystal additive is the same as that of Example 1, the solubility of CTAB in the liquid crystal medium is not ensured, so that it is not suitable to realize the liquid crystal cell switching between the transparent mode and the scattering mode.

Comparative Example 4

A liquid crystal cell was prepared by the same method as Example 1, except that in preparing the liquid crystal composition, 0.4 g (about 10% by weight) of CTAC (Cetyltrimethyl ammonium chloride, TCI) was used instead of propylene carbonate as a liquid crystal additive. Also, in the case of Comparative Example 4, although the content of the liquid crystal additive is the same as that of Example 1, the solubility of CTAC in the liquid crystal medium is not ensured, so that it is not suitable to realize the liquid crystal cell switching between the transparent mode and the scattering mode.

Evaluation of Horizontal Conductivity

For the liquid crystal cells prepared in Examples 1 to 3 and Comparative Examples 1 and 2, the horizontal conductivities were measured and the results were shown in Table 1 below. FIG. 5 showed a graph of the horizontal conductivities in the liquid crystal layer to the dielectric constants of the liquid crystal additives of Examples 1 to 3. As shown in FIG. 5, it can be seen that the horizontal conductivity (unit: S/m) of the liquid crystal layer has a linear relationship relative to the dielectric constant of the liquid crystal additive (when the x coordinate is set as the dielectric constant of the liquid crystal additive and the y coordinate is set to the horizontal conductivity of the liquid crystal layer, $R^2$ in FIG. 5 is a value representing whether x and y values correspond to the equation of $y=1E-07x+4E-07$, wherein if $R^2$ is 1, this means to meet 100%, and according to FIG. 5, it can be seen to meet 98.59% with the above equation).

Haze Evaluation

For the liquid crystal cells prepared in Examples 1 to 3 and Comparative Examples 1 and 2, hazes were evaluated according to voltages, and then the results were shown in Table 1 and FIGS. 6 (Examples 1 to 2) to 7 (Comparative Examples 1 to 2).

TABLE 1

| | | Example | | | Comparative Example | |
|---|---|---|---|---|---|---|
| | | 1 | 2 | 3 | 1 | 2 |
| Horizontal Conductivity ($\sigma_{//}$) ($\times 10^{-6}$) | | 7.54 | 4.46 | 1.09 | 3.23 | 4.56 |
| Haze (%) | 30 V | 88.6 | 75.2 | 66.3 | 72.0 | 84.6 |
| | 50 V | 91.9 | 75.9 | 68.2 | 78.3 | 87.6 |
| | 60 V | 93.6 | 83.3 | 74.0 | 81.2 | 86.0 |

Example 4

Preparation of DSM (Dynamic Scattering Mode) Liquid Crystal Composition

To 10 mL vial, 3.6 g of liquid crystals (HNG726200-100, HCCH company, dielectric anisotropy: −4.0, refractive index anisotropy: 0.225), and 0.40 g of reactive mesogen (RM1) (HCM-008, HCCH company) and 0.04 g of an anisotropic dye (X12, BASF) as additives were added and then stirred at 100° C. for 24 hours to prepare a liquid crystal composition.

Preparation of DSM (Dynamic Scattering Mode) Liquid Crystal Cell

After two sheets of PC (polycarbonate) films sequentially forming an ITO (Indium Tin Oxide) transparent electrode layer and a vertical alignment film were disposed apart from each other such that the vertical alignment films faced each other and had an interval of about 9 m, the prepared liquid crystal composition was injected between the apart disposed PC films and the edges were sealed to prepare a liquid crystal cell having an area of 2.2 cm×4.0 cm and an interval of 9 m. As the vertical alignment film, one obtained by coating a vertical alignment composition (Nissan 5661) on the ITO transparent electrode layer and baking it at a temperature of 100° C. or more for 5 minutes or more was used.

Examples 5 to 8

A liquid crystal cell was prepared in the same manner as Example 1, except that the kind and content of the liquid crystal additive were adjusted as in Table 2 below.

TABLE 2

| | Example | | | | |
|---|---|---|---|---|---|
| | 4 | 5 | 6 | 7 | 8 |
| Liquid Crystal | HNG726200-100, HCCH, 100% by weight | | | | |
| Additive Type | HCM-008 RM1 | HCM-009 RM2 | HCM-020 RM3 | HCM-021 RM4 | HCM-064 RM5 |
| Additive Content | 10% by weight | 10% by weight | 10% by weight | 10% by weight | 10% by weight |
| Dye | X12, BASF 1% by weight | | | | |

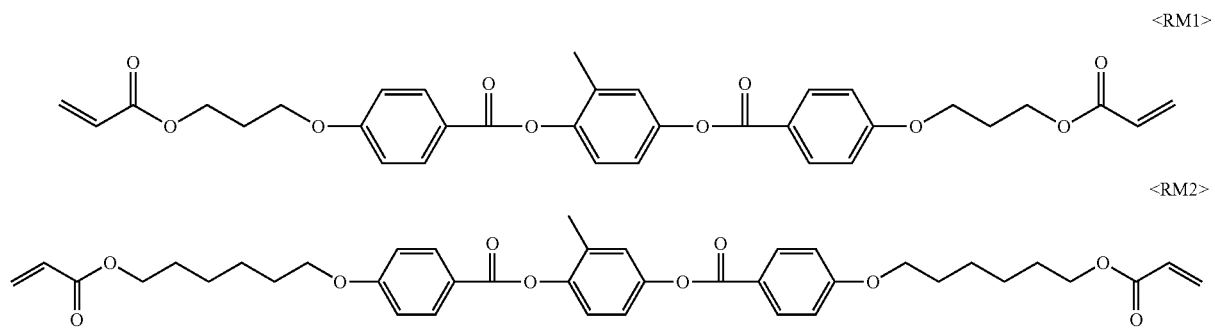

<RM1>

<RM2>

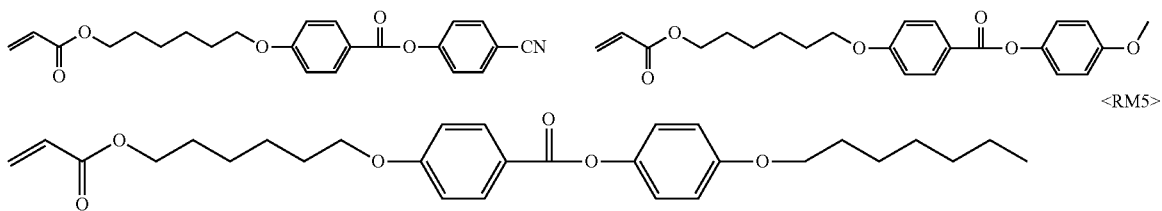

Comparative Examples 5 to 9

A liquid crystal cell was prepared in the same manner as Example 1, except that the kind and content of the liquid crystal additive were adjusted as in Table 3 below.

TABLE 3

|  | Comparative Example | | | | |
|---|---|---|---|---|---|
|  | 5 | 6 | 7 | 8 | 9 |
| Liquid Crystal | HNG726200-100, HCCH, 100% by weight | | | | |
| Additive Type | CTAB | CTAC | TPP + I₂ | CTC | HQBQ |
| Additive Content | 1% by weight | 1% by weight | 2% by weight | 1% by weight | 0.7% by weight |
| Dye | X12, BASF 1% by weigh | | | | |

[CTAC: Cetyltrimethyl ammonium bromide]

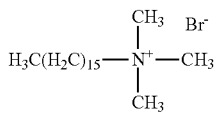

[CTAC: Cetyltrimethyl ammonium chloride]

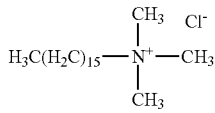

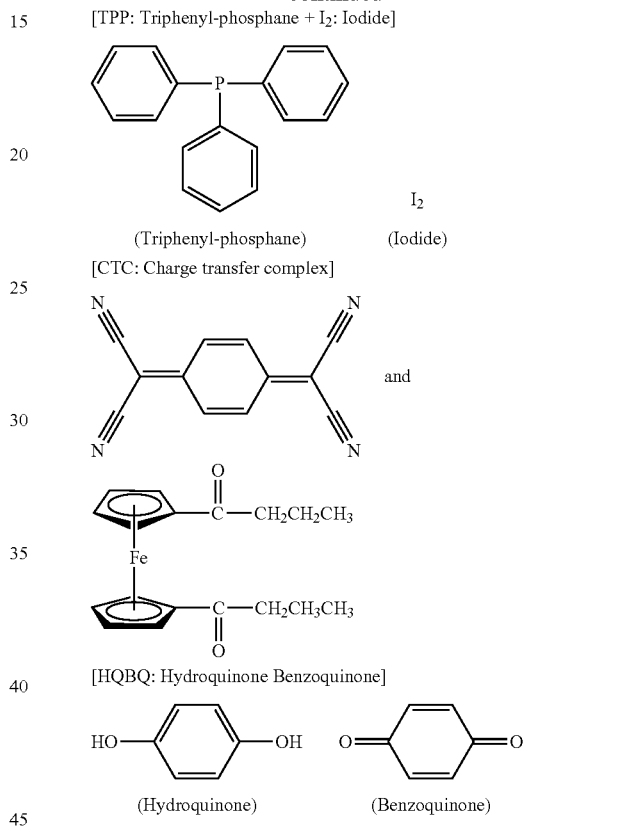

For Examples 4 to 9 and Comparative Examples 5 to 9, solubility characteristics, conductivity characteristics, haze characteristics and transmittance variable characteristics were evaluated, and then the results were described in Tables 4 to 5 below.

TABLE 4

|  | Example | | | | |
|---|---|---|---|---|---|
|  | 4 | 5 | 6 | 7 | 8 |
| Solubility Characteristic | ○ | ○ | ○ | ○ (−20° C.)* | ○ |
| Measured $\sigma_{//}$ [S/m] | $4.66 \times 10^{-6}$ | $3.1 \times 10^{-6}$ | $6.4 \times 10^{-6}$ | $4.8 \times 10^{-6}$ | $3.2 \times 10^{-6}$ |
| Converted $\sigma_{//}$ [μS/cm] | $4.77 \times 10^{-4}$ | $3.17 \times 10^{-4}$ | $6.55 \times 10^{-4}$ | $4.91 \times 10^{-4}$ | $3.27 \times 10^{-4}$ |
| Measured $\sigma_{v}$ [S/m] | $1.45 \times 10^{-6}$ | $1.3 \times 10^{-6}$ | $3.6 \times 10^{-6}$ | $2.4 \times 10^{-6}$ | $2.1 \times 10^{-6}$ |
| Converted $\sigma_{v}$ [μS/cm] | $1.48 \times 10^{-4}$ | $1.33 \times 10^{-4}$ | $3.68 \times 10^{-4}$ | $2.45 \times 10^{-4}$ | $2.15 \times 10^{-4}$ |
| Haze (30 V) (%) | 41.7 | 41.7 | 92.8 | 88.6 | 87.2 |
| Haze (40 V) (%) | 88.0 | 88.0 | 94.7 | 94.0 | 91.6 |

TABLE 4-continued

|  | Example | | | | |
| --- | --- | --- | --- | --- | --- |
|  | 4 | 5 | 6 | 7 | 8 |
| Haze (60 V) (%) | 95.7 | 95.7 | 96.0 | 95.9 | 94.41 |
| T (0 V – 40 V) (%) | 39.1 | 39.5 | 32.5 | 40.8 | 39.3 |
| T (0 V – 60 V) (%) | 42.8 | 44.3 | 38.4 | 43.5 | 42.6 |

Haze ("X" V): Haze value at "X" V
T (0 V – "X" V): a value obtained by subtracting the transmittance at "X" V from the transmittance at 0 V
*Example 7 has excellent solubility characteristics even at −20° C.

TABLE 5

|  | Comparative Example | | | | |
| --- | --- | --- | --- | --- | --- |
|  | 5 | 6 | 7 | 8 | 9 |
| Solubility Characteristic | X | X | X* | X | X |
| Measured $\sigma_{//}$ [S/m] | $9.7 \times 10^{-6}$ | $4.5 \times 10^{-6}$ | $2.7 \times 10^{-6}$ | $2.5 \times 10^{-5}$ | $2.1 \times 10^{-6}$ |
| Converted $\sigma_{//}$ [μS/cm] | $9.92 \times 10^{-4}$ | $4.60 \times 10^{-4}$ | $2.76 \times 10^{-4}$ | $2.56 \times 10^{-4}$ | $2.15 \times 10^{-4}$ |
| Measured $\sigma_{\perp}$ [S/m] | $8.1 \times 10^{-6}$ | $3.7 \times 10^{-6}$ | $2.2 \times 10^{-6}$ | $2.2 \times 10^{-5}$ | $1.7 \times 10^{-6}$ |
| Converted $\sigma_{\perp}$ [μS/cm] | $8.28 \times 10^{-4}$ | $3.78 \times 10^{-4}$ | $2.25 \times 10^{-4}$ | $2.25 \times 10^{-4}$ | $1.74 \times 10^{-4}$ |
| Haze (30 V) (%) | 81.3 | 66.4 | 68.3 | 92.6 | 27.1 |
| Haze (40 V) (%) | 84.8 | 72.0 | 81.9 | 94.9 | 52.2 |
| Haze (60 V) (%) | 88.6 | 68.1 | 93.2 | 95.9 | 63.0 |
| T (0 V – 40 V) (%) | 37.2 | 36.8 | 33.0 | 33.9 | 33.6 |
| T (0 V – 60 V) (%) | 39.6 | 39.3 | 35.2 | 38.3 | 35.5 |

Haze ("X" V): Haze value at "X" V
T (0 V – "X" V): a value obtained by subtracting the transmittance at "X" V from the transmittance at 0 V
*Comparative Example 3 forms a complex and generates crystals.

Example 9

A liquid crystal cell of Example 9 was prepared in the same manner as Example 4, except that the type and content of the liquid crystal additive were adjusted as in Table 6 below and a filtering process was further performed using a filter having a size of 0.1 m in order to remove the insoluble ionic additive and CTAC.

In addition, for Example 9, the solubility characteristic, the conductivity characteristic, the haze characteristic and the transmittance variable characteristic were evaluated, and then the results were described as in Table 6 below, compared with those of Example 5. Also, the hazes according to voltages were evaluated for Examples 5 and 9, and the results were shown in FIG. 8.

TABLE 6

|  | Example 5 | Example 9 |
| --- | --- | --- |
| Liquid Crystal | HNG726200-100 | |
| Dye | X12, BASF 1% by weight | |
| RM Additive | HCM-009 RM2 | HCM-020 RM3 |
| Additive Content | 10% by weight | 10% by weight |
| Ionic Additive | X | Filter after applying CTAC 1% by weight |
| Solubility Characteristic | ○ | ○ |
| Measured $\sigma_{//}$ [S/m] | $3.1 \times 10^{-6}$ | $1.7 \times 10^{-5}$ |
| Converted $\sigma_{//}$ [μS/cm] | $3.17 \times 10^{-4}$ | $1.74 \times 10^{-3}$ |
| Measured $\sigma_{\perp}$ [S/m] | $1.3 \times 10^{-6}$ | $9.8 \times 10^{-6}$ |
| Converted $\sigma_{\perp}$ [μS/cm] | $1.33 \times 10^{-4}$ | $1.00 \times 10^{-3}$ |
| Haze (30 V) (%) | 41.7 | 92.8 |
| Haze (40 V) (%) | 88.0 | 95.4 |
| Haze (60 V) (%) | 95.7 | 96.2 |
| T (0 V – 40 V) (%) | 39.5 | 37.2 |
| T (0 V – 60 V) (%) | 44.3 | 39.9 |

DESCRIPTION OF REFERENCE NUMERALS

101: liquid crystal layer
102: liquid crystal compound
201A, 201B: substrate
301A, 301B: electrode layer
401A, 401B: vertical alignment film

The invention claimed is:

1. A liquid crystal cell switching between a transparent mode and a scattering mode by applying external energy, said liquid crystal cell comprising a liquid crystal layer, two substrates, and two electrode layers, wherein said two substrates and said two electrode layers are disposed opposite to both sides of said liquid crystal layer,
   wherein said liquid crystal layer comprises a liquid crystal compound and a non-ionic compound,
   wherein said liquid crystal layer has a horizontal conductivity ($\sigma//$) of $1.0 \times 10^{-7}$ S/m or more,
   wherein said liquid crystal compound has a negative dielectric anisotropy,
   wherein said non-ionic compound is a high dielectric constant material which has a dielectric constant (ε) of 3 or more, and
   wherein said high dielectric constant material is one or more selected from the group consisting of lactone compounds, sulfolane compounds and alkyl aniline compounds.

2. The liquid crystal cell according to claim 1, wherein said liquid crystal layer is not recrystallized at room temperature.

3. The liquid crystal cell according to claim 1, wherein said liquid crystal layer further comprises an anisotropic dye.

4. The liquid crystal cell according to claim 1, wherein said liquid crystal layer is capable of switching between a transparent mode having a haze of less than 10% and a scattering mode having a haze of 10% or more.

5. The liquid crystal cell according to claim 1, wherein said liquid crystal layer is in a transparent mode in a state in which no external energy is applied and to be capable of switching to a scattering mode when external energy is applied.

6. The liquid crystal cell according to claim 1, wherein said liquid crystal compound exists in a vertically aligned state in a state in which no external energy is applied.

7. The liquid crystal cell according to claim 1, further comprising two vertical alignment films disposed opposite to both sides of said liquid crystal layer.

8. A smart window comprising the liquid crystal cell of claim 1.

* * * * *